April 5, 1949.                    W. A. PRINGLE ET AL                    2,466,476
                         DYNAMOELECTRIC VOLTAGE REGULATOR
                                Filed Nov. 30, 1946
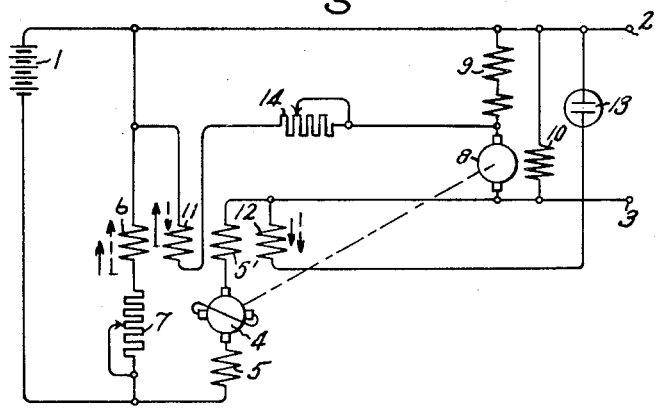
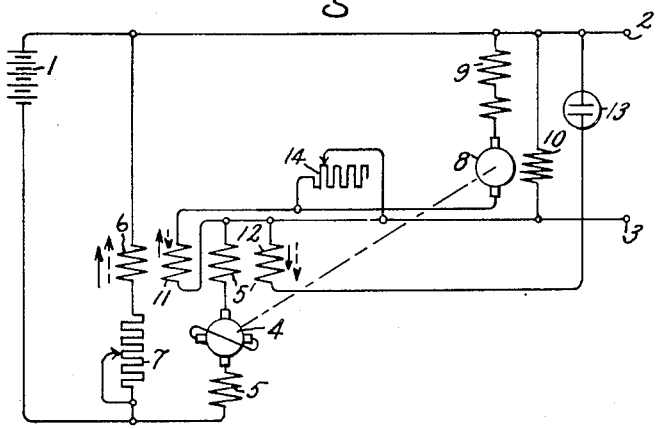
Inventors:
William A. Pringle,
Wesley R. Goss,
by *Browell S. Mack*
Their Attorney.

Patented Apr. 5, 1949

2,466,476

UNITED STATES PATENT OFFICE 2,466,476

DYNAMOELECTRIC VOLTAGE REGULATOR

William A. Pringle and Wesley R. Goss, Fort Wayne, Ind., assignors to General Electric Company, a corporation of New York Application November 30, 1946, Serial No. 713,250

13 Claims. (Cl. 323—10)

This invention relates to voltage control circuits, and more particularly to systems for providing constant voltage output from a variable voltage direct current supply.

It is customary in the railway art to provide a source of direct current on railway locomotives and cars for operating lights, refrigerating equipment, and other auxiliary D.-C. electrical apparatus. Such power is usually supplied from an axle-driven generator when the vehicle is in motion or from a set of storage batteries during standstill conditions. The need for constant voltage direct current cannot be adequately supplied from the ordinary train storage battery over extended periods of operation inasmuch as the voltage of the battery varies over fairly wide limits depending upon its state of charge. It is therefore essential to provide voltage correcting or regulating means which should be automatic in operation and in addition lend itself to ease of maintenance and utilize as little space and weight as possible.

It is therefore an object of this invention to provide an improved voltage control circuit for direct current power supply systems.

It is another object of this invention to provide a voltage control system for producing constant voltage D.-C. output from a variable voltage D.-C. source.

It is a further object of this invention to provide improved dynamo-electric apparatus for converting variable voltage direct current energy to constant voltage direct current energy.

In accordance with our invention we provide a dynamo-electric motor-generator set in which a conventional D.-C. driving motor is mechanically coupled to an armature reaction-excited direct axis-compensated generator of the type referred to as the amplidyne. The amplidyne generator acts as a buck-boost generator in series with the battery supplying direct current energy and the control field windings of the amplidyne are energized in response to the action of a neon glow tube, which is essentially a constant voltage device, and in response to the current flowing in the armature circuit of the drive motor. The resultant amplidyne exciting flux is reversible, so that the amplidyne generator serves as a voltage adjusting means connected to boost or to buck the battery voltage. For example, when the battery voltage is lower than the required voltage level to be maintained on the railway vehicle, the motor drives the amplidyne generator as a boosting generator, thereby raising the battery voltage to the required level. In the other condition, when the battery voltage is excessively high the amplidyne generator operates as a motor absorbing energy from the battery and driving the motor as a direct current generator to supply additional current to the regulated output. The system is entirely automatic once initial adjustments have been made, and may be constructed to be extremely compact and simple, having a minimum of moving parts and associated control equipment.

For a better understanding of our invention reference should now be had to the following description taken in connection with the accompanying drawings, and its scope will be pointed out in the appended claims. Fig. 1 of the drawings shows a preferred embodiment of this invention as applied in an output voltage control means supplied from a battery-powered direct current source, and Fig. 2 shows an alternative arrangement of the same system shown in Fig. 1.

Referring to Fig. 1, we have shown a storage battery 1 connected to supply direct current energy to the load terminals 2 and 3 of the electrical power system of a railway vehicle. Connected in series with the negative side of the battery 1 and with load terminal 3 is a voltage raising or lowering device, which we have shown as the armature 4 and compensating field windings 5 and 5' of an amplidyne generator. Because of its very rapid speed of response and high degree of sensitivity, requiring very low levels of energy for control purposes, we prefer to use a machine of the armature reaction-excited direct axis-compensated type, such as the amplidyne which is described and claimed in Patent No. 2,227,992, issued January 7, 1941 upon an application of M. A. Edwards and E. F. W. Alexanderson and assigned to the same assignee as the present invention.

The amplidyne generator 4 is provided with a plurality of control field windings; the battery voltage energized control field winding 6 is placed directly across the battery 1 being in series with the control field adjusting resistance 7. Connected in parallel with the voltage output terminals 2 and 3 is an energy transforming device of the dynamo-electric machine type such as the direct current driving motor 8 which absorbs or produces energy and is mechanically connected to the amplidyne generator 4 and if desired may be combined in the same frame, thereby making a very compact motor-generator unit. The amplidyne driving motor 8 may be compounded by being provided with a series field 9 and has a shunt field 10 connected directly across the load terminals 2 and 3. The amplidyne field winding 6 may be connected across the regulated voltage terminals 2 and 3 or may be omitted entirely and its magneto-motive force supplied by increased ampere turns in the other control field windings for the amplidyne 4.

In order to introduce a control component of flux into the amplidyne proportional to the armature current of the driving motor 8, a second control field winding 11 is disposed in the frame of the amplidyne and as shown in Fig. 1 is connected in shunt relationship with the series field winding 9 of the driving motor 8 or in shunt with the inter-pole winding in the case of a shunt motor. Thus, the control field winding 11 carries a current that is directly proportional to the armature current flowing in the driving motor 8. A third control field winding 12 for the amplidyne responsive to load terminal voltage is provided and, as shown, is in series with the neon glow tube 13 and placed directly across the regulated voltage output terminals 2 and 3. The neon glow tube is selected to have a conducting voltage value less than the value of regulated voltage it is desired to maintain at the load terminals 2 and 3. The voltage applied to the tube 13 may be adjusted to suit the particular tube used by means of a conventional voltage divider, if desired. A variable resistance 14 is placed in series with the control field 11 for making initial adjustments.

In order to better understand the operation of this invention we have placed arrows representing direction of flux produced in the various control field windings 6, 11, and 12 of the amplidyne and for simplicity have shown the arrows as solid for representing conditions when the battery voltage is less than the required regulated output voltage and have shown the arrows as dotted when the battery voltage exceeds the required output voltage. In addition, the arrows have been shown as having different lengths, thereby roughly approximating the proportionate values of magnetomotive force produced in those windings during the aforementioned conditions of operation. For example, it will be noted that the solid arrow and the dotted arrow alongside of control field winding 6 indicate that the magnetomotive force produced by this winding is always in the same direction and since the energizing circuit for this winding may be considered as being a resistance circuit, the magnetomotive force produced therein is directly proportional to the battery voltage; hence the dotted arrows show a greater magnetomotive force corresponding to the higher battery voltage. The arrows alongside the control field winding 12 indicate that the magnetomotive force produced by this winding is always in the same direction and also indicate that the flux produced therein varies with the voltage existing across the output terminals 2 and 3. Since the neon glow tube has a nonlinear voltage-current characteristic, it should be pointed out that a very slight increase in voltage across the tube produces a disproportionately greater increase in current through the control field winding 12. The magnetomotive force produced by the control field winding 11 is reversible, as shown, depending on whether the driving motor 8 is acting as a motor in the case of low battery voltage or whether it is being driven as a generator by the amplidyne in the case of high battery voltage.

If it is assumed that the battery voltage is excessive and exceeds the required regulated output voltage, it will be seen that it is necessary for the amplidyne to act as a bucking machine, thereby reducing the voltage supplied to the output circuit. In order to fulfill this condition, the amplidyne will be excited to run as a motor and will drive the driving motor 8 as a generator, supplying additional current to the output circuit. Under these conditions, the neon tube 13 will be passing current through the control field winding 12, as shown by the dotted arrow. The control winding 6 will also be energized to a substantial amount but in the opposite direction to control field winding 12. The regulated field winding 11 will be producing magnetomotive force in a direction to aid the magnetomotive force produced by the control field winding 12. The direction and lengths of the dotted arrows in this case indicate that the resultant flux is in a direction to produce a motoring action of the amplidyne.

In case the battery voltage decreases until it is less than the required regulated output voltage, the current in the control field winding 6 will be proportionately reduced and the current in regulating field 11 will reverse as the dynamo electric machine 8 across the regulated voltage will change from a generating state to a motoring state. The net magnetomotive force effective for excitation of the amplidyne will be reversed in polarity. This is shown by the relative lengths and direction of the solid arrows alongside the windings 6, 11, and 12. Since the armature current in the amplidyne must remain in the same direction, this reversal in field polarity causes the amplidyne to operate as a generator being driven by the motor 8, thereby supplying an additional voltage output which when added to the battery voltage will bring the regulated output voltage up to the required level.

Under conditions when the battery voltage minus the RI drop in the amplidyne is exactly equal to the required output voltage, the sum of the magnetomotive forces produced by fields 6 and 11 will be equal in magnitude and opposite in polarity to the magnetomotive force produced by field 12 so that the net resultant magnetomotive force tending to excite the amplidyne will be zero.

The modification shown in Fig. 2 is very similar and operates in an identical manner to that previously described in connection with Fig. 1. It will be noted that the only difference in the system of Fig. 2 lies in the circuit arrangement for energizing the control field winding 11. In Fig. 2, the control field winding 11 is placed directly in series with the armature 8 of the driving motor. It therefore carries total motor armature current instead of being in shunt relationship with the motor series field 9 and carrying only a proportionate part of motor armature current. If this arrangement is used, an adjustable resistance 14 may be placed in parallel with the field winding 11 so that the proper initial adjustments of field winding current can be easily made.

It has been found that by using the arrangement as shown and described wherein the additional magnetomotive force proportional to motor armature current is provided, very good regulation may be obtained. For example, in one specific case it was desired to maintain approximately 60 volts at the load terminals 2 and 3 from a battery whose voltage varied over the range of 52 to 90 volts depending on its state of charge. In this case the neon tube was selected to have an operating voltage of approximately 58 volts and it was found that the regulated output voltage was maintained in the range of 60 to 62 volts over the entire range of battery voltage encountered and with varying values of load current up to as great as 50 amperes. If desired, a number of neon glow tubes 13 may be used in parallel to provide additional safety so that in the event one tube fails the tube having next slightly higher breakdown voltage will immediately become conducting and take over the regulation of the control system.

While we have shown and described a particular embodiment of our invention it will be obvious to those skilled in the art that changes and modifications may be made without departing from our invention in its broader aspects and we therefore aim in the appended claims to cover all such changes and modifications as fall within the true spirit and scope of our invention.

What we claim as new and desire to secure by Letters Patent of the United States, is:

1. A voltage regulating system for supplying constant voltage direct current from a variable voltage source comprising, a pair of output terminals, voltage adjusting means connected in series with said energy source for adding to or subtracting from said source voltage to maintain substantially constant said output terminal voltage, electrical energy absorbing or producing means connected in parallel with said output terminals, means responsive to output terminal voltage for controlling said voltage adjusting means, said means including a glow tube device having a nonlinear voltage-current characteristic, and means responsive to current flow in said energy absorbing or producing means for controlling said voltage adjusting means to maintain constant said output terminal voltage.

2. A voltage regulating system for supplying constant voltage direct current from a variable voltage source of direct current energy comprising, a pair of output terminals, electrical energy transforming means shunted across said output terminals, voltage adjusting means connected in series with said energy source for bucking or boosting said source voltage to maintain substantially constant said output terminal voltage, said means including a control flux component responsive to the magnitude and direction of current flow in said energy transforming means for controlling said voltage adjusting means, and means non-linearly responsive to output terminal voltage for modifying the action of said reversible potential supply means.

3. A voltage regulating system comprising a variable voltage source of direct current energy, a pair of output terminals for a load circuit, voltage adjusting means connected in series with said energy source for adding to or subtracting from said source voltage to maintain substantially constant said output terminal voltage, electrical energy absorbing or producing means connected in parallel with said output terminals, means responsive to output terminal voltage for controlling said voltage adjusting means, said means including a current controlling element having a non-linear voltage-current characteristic, and means responsive to the magnitude and direction of current flow in said energy absorbing or producing means for controlling said voltage adjusting means.

4. A control system for supplying constant voltage direct current energy from a variable voltage source comprising a first dynamo-electric machine connected in series with said variable voltage source, a pair of output terminals, a second dynamo-electric machine having its armature connected in parallel with said output terminals and mechanically connected to said first dynamo-electric machine, means proportionately responsive to the voltage of said source for exciting said first dynamo-electric machine, means non-linearly responsive to said output terminal voltage for exciting said first dynamo-electric machine, and means proportionately responsive to armature current of said second dynamo-electric machine for exciting said first dynamo-electric machine effective to maintain constant said output terminal voltage.

5. A control system for supplying constant voltage direct current energy from a variable voltage source comprising a first dynamo-electric machine connected in series with said variable voltage source, a pair of output terminals, a second dynamo-electric machine having its armature connected in parallel with said output terminals and mechanically connected to said first dynamo-electric machine, means proportionately responsive to the voltage of said source for exciting said first dynamo-electric machine, means non-linearly responsive to said output terminal voltage for exciting said first dynamo-electric machine, said last-named means including a glow tube device having the characteristic of permitting a relatively large change in current flow with a small change in applied voltage, and means proportionately responsive to armature current of said second dynamo-electric machine for exciting said first dynamo-electric machine to maintain constant said output terminal voltage.

6. A control system for supplying constant voltage direct current energy from a variable voltage source comprising a first dynamo-electric machine connected in series with said variable voltage source, a pair of output terminals, a second dynamo-electric machine connected in parallel with said output terminals, and means responsive to the magnitude of said source voltage for exciting said first dynamo-electric machine, said last-named means including a current conducting glow tube element having a nonlinear voltage-current characteristic, and means responsive to armature current of said second dynamo-electric machine for exciting said first dynamo-electric machine to maintain constant said output terminal voltage.

7. A control system for supplying constant voltage direct current energy from a variable voltage source comprising a first dynamo-electric machine connected in series with said variable voltage source, a pair of output terminals, a second dynamo-electric machine connected in parallel wtih said output terminals, means responsive to the voltage of said source for exciting said first dynamo-electric machine, means responsive to said output terminal voltage for exciting said first dynamo-electric machine, said last-named means including a current conducting element having a nonlinear voltage-current characteristic, and means responsive to the magnitude and direction of armature current flow in said second dynamo-electric machine for exciting said first dynamo-electric machine to buck or boost said source voltage effective to maintain said output terminal voltage substantially constant.

8. A voltage regulating system comprising a variable voltage source of direct current energy, a pair of output terminals, a first dynamo-electric machine connected in series with said energy source and having a plurality of control field windings, a second dynamo-electric machine connected in parallel with said output terminals and mechanically connected to said first dynamo-electric machine, means responsive to output terminal voltage for exciting the first of said control field windings, means responsive to the voltage of said energy source for energizing with opposite polarity the second of said control field windings, and means responsive to armature current flow in said second dynamo-electric machine for exciting the third of said control field windings with a polarity reversible depending on the direction of said armature current flow.

9. A voltage regulating system comprising a variable voltage source of direct current energy, a pair of output terminals, a first dynamo-electric machine connected in series with said energy source and having a plurality of control field windings, a second dynamo-electric machine connected in parallel with said output terminals and mechanically connected to said first dynamo-electric machine, means responsive to output terminal voltage for exciting the first of said control field windings, said last-named means including a current conducting device having a nonlinear voltage-current characteristic, means responsive to the voltage of said energy source for energizing with opposite polarity the second of said control field windings, and means responsive to armature current flow in said second dynamo-electric machine for exciting the third of said control field windings with a current having a magnitude and polarity depending on the magnitude and direction of said armature current flow.

10. A car battery voltage control system comprising in combination an electric battery, a pair of regulated voltage output terminals, a first dynamo-electric machine connected in series circuit relationship wtih said battery and said output terminals for bucking or boosting said battery voltage, a plurality of control field windings for said first dynamo-electric machine, a second dynamo-electric machine connected in parallel circuit relationship with said output terminals and mechanically connected to said first dynamo-electric machine, a first control field winding for said first dynamo-electric machine arranged for excitation in response to the magnitude and direction of armature current flow in said second dynamo-electric machine, and a second control field winding for said first dynamo-electric machine arranged to be energized nonlinearly in response to the voltage of said output terminals, said energizing means for said second control field winding including a nonlinear element having a substantially constant voltage characteristic.

11. A car battery voltage control system comprising in combination an electric battery, a pair of regulated voltage output terminals, a first dynamo-electric machine having its armature connected in series circuit relationship with said battery and said output terminals for bucking or boosting said battery voltage, a plurality of control field windings for said first dynamo-electric machine, a second dynamo-electric machine having its armature connected in parallel circuit relationship with said output terminals and mechanically connected to said first dynamo-electric machine, a first control field winding for said first dynamo-electric machine arranged for energization in response to the magnitude and direction of armature current flow in said second dynamo-electric machine, a second control field winding for said first dynamo-electric machine arranged to be energized nonlinearly in response to the voltage of said output terminals, said energizing means for said second control field winding including a glow tube element having a nonlinear voltage-current characteristic, and a third control field winding for said first dynamo-electric machine energized in direct proportion to the voltage of said battery.

12. A vehicle car battery voltage control system comprising in combination an electric battery, a pair of regulated voltage output terminals, a first dynamo-electric machine connected in series circuit relationship with said battery and said output terminals for bucking or boosting said battery voltage, a pair of control field windings for said first dynamo-electric machine, a second dynamo-electric machine connected in parallel circuit relationship with said output terminals and mechanically coupled to said first dynamo-electric machine, means for producing a magnitude and polarity of current flow in the first of said control field windings for said first dynamo-electric machine proportional to the magnitude and direction of armature current flow in said second dynamo-electric machine, and means for energizing the second of said control field windings for said first dynamo-electric machine with a current that varies nonlinearly with the voltage of said output terminals, said energizing means for said second control field winding including a glow tube element having a nonlinear voltage-current characteristic.

13. A voltage regulating system for supplying constant voltage direct current from a variable voltage source of direct current energy comprising, a pair of output terminals, a first dynamo-electric machine shunted across said output terminals, a second dynamoelectric machine connected in series with said source, a plurality of control field windings for said machine, means responsive to the magnitude of said source voltage for supplying energizing control voltage to said field windings of said second dynamoelectric machine, said last-mentioned means including a glow tube device having a non-linear current carrying capacity for linear voltage changes.

WILLIAM A. PRINGLE.
WESLEY R. GOSS.

REFERENCES CITED

The following references are of record in the file of this patent:

UNITED STATES PATENTS

| Number | Name | Date |
| --- | --- | --- |
| 1,160,609 | Hubbard | Nov. 16, 1915 |